US006529999B1

(12) United States Patent
Keller et al.

(10) Patent No.: US 6,529,999 B1
(45) Date of Patent: Mar. 4, 2003

(54) COMPUTER SYSTEM IMPLEMENTING SYSTEM AND METHOD FOR ORDERING WRITE OPERATIONS AND MAINTAINING MEMORY COHERENCY

(75) Inventors: James B. Keller, Palo Alto, CA (US); Derrick R. Meyer, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/428,642

(22) Filed: Oct. 27, 1999

(51) Int. Cl.[7] .............................................. G06F 12/00
(52) U.S. Cl. ...................... 711/141; 711/119; 711/120; 711/121; 711/143; 711/147; 711/154; 711/210; 712/28
(58) Field of Search ................................ 711/148, 121, 711/141, 143, 151, 210, 119, 120, 147, 154; 712/28

(56) References Cited

U.S. PATENT DOCUMENTS

| | | | |
|---|---|---|---|
| 5,749,095 A | 5/1998 | Hagersten | 711/141 |
| 6,014,690 A * | 1/2000 | VanDoren et al. | 709/215 |
| 6,101,420 A | 8/2000 | Van Doren et al. | 700/5 |
| 6,108,752 A | 8/2000 | Van Doren et al. | 711/117 |
| 6,148,361 A * | 11/2000 | Carpenter et al. | 710/260 |
| 6,167,492 A | 12/2000 | Keller et al. | 711/154 |
| 6,209,065 B1 | 3/2001 | Van Doren et al. | 711/150 |
| 6,249,846 B1 | 6/2001 | Van Doren et al. | 711/144 |
| 6,275,905 B1 | 8/2001 | Keller et al. | 711/141 |
| 6,295,583 B1 | 9/2001 | Razdan et al. | 711/137 |
| 6,298,418 B1 * | 10/2001 | Fujiwara et al. | 711/144 |
| 6,370,621 B1 | 4/2002 | Keller | 711/141 |
| 6,385,705 B1 | 5/2002 | Keller et al. | 711/154 |
| 6,389,526 B1 | 5/2002 | Keller et al. | 712/30 |
| 6,393,529 B1 | 5/2002 | Keller | 711/144 |

\* cited by examiner

*Primary Examiner*—Do Hyun Yoo
*Assistant Examiner*—Jasmine Song
(74) *Attorney, Agent, or Firm*—Lawrence J. Merkel (57) ABSTRACT

A computer system is presented implementing a system and method for properly ordering write operations. The system and method for properly ordering write operations aids in maintaining memory coherency within the computer system. The computer system includes multiple interconnected processing nodes. One or more of the processing nodes includes a central processing unit (CPU) and/or a cache memory, and one or more of the processing nodes includes a memory controller coupled to a memory. The CPU or cache generates a write command to store data within the memory. The memory controller receives the write command and responds to the write command by issuing a target done response to the CPU or cache after the memory controller: (i) properly orders the write command within the memory controller with respect to other commands pending within the memory controller, and (ii) determines that a coherency state with respect to the write command has been established within the computer system.

8 Claims, 6 Drawing Sheets

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Mask/Count[1:0] | | Compat | SrcTag[4:0] | | | | |
| 4 | Addr[7:2] | | | | | | Mask/Count[3:2] | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

FIG. 4

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | TgtNode[3:0] | | | | TgtUnit[1:0] | | SrcNode[2:0] | |
| 3 | MD | Rsv | | SrcTag[4:0] | | | | |
| 4 | Addr[7:3] | | | | | NextState[1:0] | | RD |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

FIG. 5

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Rsv | | Error | SrcTag[4:0] | | | | |
| 4 | Shared | | Rsv | Rsv | | | | |

FIG. 6

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Rsv | | Error | SrcTag[4:0] | | | | |
| 4 | Rsv | | | Rsv | | | | |

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Rsv | | | SrcTag[4:0] | | | | |
| 4 | Addr[7:3] | | | | | Rsv | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

FIG. 9

COMPUTER SYSTEM IMPLEMENTING SYSTEM AND METHOD FOR ORDERING WRITE OPERATIONS AND MAINTAINING MEMORY COHERENCY

BACKGROUND OF THE INVENTION

1. Field of the Invention

This invention is related to the field of computer systems and, more particularly, to computer systems wherein write operations modifying the contents of memory must be properly ordered with respect to one another in order to maintain memory coherency within the computer systems.

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, the multiple devices attached to the shared bus present a relatively large electrical capacitance to devices driving signals on the bus. In addition, the multiple attach points on the shared bus produce signal reflections at high signal frequencies which reduce signal integrity. As a result, signal frequencies on the bus are generally kept relatively low in order to maintain signal integrity at an acceptable level. The low signal frequencies reduce signal bandwidth, limiting the performance of devices attached to the bus.

Lack of scalability to larger numbers of devices is another disadvantage of shared bus systems. As mentioned above, the available bus bandwidth is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus. Overall performance of the computer system including the shared bus will most likely be reduced.

On the other hand, distributed memory systems lack many of the above disadvantages. A computer system with a distributed memory system includes multiple nodes, two or more of which are coupled to different memories. The nodes are coupled to one another using any suitable interconnect. For example, each node may be coupled to each other node using dedicated lines. Alternatively, each node may connect to a fixed number of other nodes, and transactions may be routed from a first node to a second node to which the first node is not directly connected via one or more intermediate nodes. A memory address space of the computer system is assigned across the memories in each node.

In general, a "node" is a device which is capable of participating in transactions upon the interconnect. For example, the interconnect may be packet based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. Alternatively, a node located on a communication path between the source and target nodes may relay the packet from the source node to the target node.

Distributed memory systems present design challenges which differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g. for coherency purposes). On the other hand, in distributed systems, nodes may initiate transactions concurrently and use the interconnect to transmit the transactions to other nodes. These transactions may have logical conflicts between them (e.g. memory coherency conflicts for transactions involving the same address).

It would thus be desirable to have a system and method for properly ordering write operations within a computer system. Such a system and method would help to maintain memory coherency within computer systems having distributed memory systems.

SUMMARY OF THE INVENTION

A computer system is presented implementing a system and method for properly ordering write operations. The system and method may aid in maintaining memory coherency within the computer system. The computer system includes multiple interconnected processing nodes. One or more of the processing nodes includes a central processing unit (CPU) and/or a cache memory, and one or more of the processing nodes includes a memory controller coupled to a memory. The CPU/cache generates a write command to store data within the memory. The memory controller receives the write command and responds to the write command by issuing a target done response to the CPU/cache after the memory controller: (i) properly orders the write command within the memory controller with respect to other commands pending within the memory controller, and (ii) determines that a coherency state with respect to the write command has been established within the computer system.

The CPU may execute instructions of a predefined instruction set, and may generate the write command in response to instruction execution. The memory controller receives the write command, and may respond to the write command by properly ordering the write command within the memory controller with respect to other commands pending within the memory controller. One or more of the processing nodes may include a cache, and the memory controller may determine the coherency state has been established within the processing nodes including a cache by: (i) sending a probe request to each processing node including a cache, and (ii) receiving a probe response from each processing node including a cache. After properly ordering the write command within the memory controller and receiving the probe response from each processing node including a cache, the coherency state with respect to the write command has been established within the computer system, and the memory controller may then issue the target done response to the CPU. The CPU may thus be informed that the write command has reached a point of coherency within the computer system.

The processing node including the CPU and the processing node including the memory controller may be different processing nodes. In this case, the processing nodes of the computer system may route the write command from the processing node including the CPU to the processing node including the memory controller.

At least two of the processing nodes may include a memory controller coupled to a different memory, and a different portion of a memory address space of the computer system may be associated with each memory controller and memory coupled thereto. In this case, the computer system has a distributed memory system.

A cache within a processing node may generate a victim block command to store data to the memory. The memory controller may receive the victim block command and respond to the victim block command by issuing a target done response to the cache. The cache may store the victim block in, for example, a buffer, and may maintain coherency for the victim block during the pendancy of the victim block command. The target done response from the memory controller may signal the cache that the cache may stop maintaining coherency for the victim block.

Before issuing the target done response to the cache, the memory controller may: (i) properly order the write command within the memory controller with respect to other commands pending within the memory controller, and (ii) determine that a coherency state with respect to the write command has been established within the computer system. With respect to the coherency state, the computer system may operate such that data coherency is maintained within the computer system. The cache may be separate from, or reside within, a CPU. At least two of the processing nodes may include a cache, and the computer system may implement a cache protocol which maintains coherency with respect to data stored within each cache.

In a first method for properly ordering memory operations within the computer system, the CPU issues a write command to store data within a memory of the computer system. A memory controller coupled to the memory receives the write command, determines that a coherency state with respect to the write command has been established within the computer system, and responds to the write command and the coherency state by issuing a target done response to the CPU. The determining step may include: (i) properly ordering the write command within the memory controller with respect to other commands pending within the memory controller, (ii) sending a probe request to each processing node including a cache, and (iii) receiving a probe response from each processing node including a cache.

In a second method for properly ordering memory operations within the computer system, a cache within a processing node issues a victim block command in order to store data within a memory of the computer system. A memory controller coupled to the memory receives the victim block command and responds to the victim block command by issuing a target done response to the cache. Before issuing the target done response to the cache, the memory controller may: (i) properly order the write command within the memory controller with respect other commands pending within the memory controller, and (ii) determine that a coherency state with respect to the write command has been established within the computer system. With respect to the coherency state, the computer system may operate such that data coherency is maintained within the computer system. As stated above, the cache may be separate from, or reside within, a CPU.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
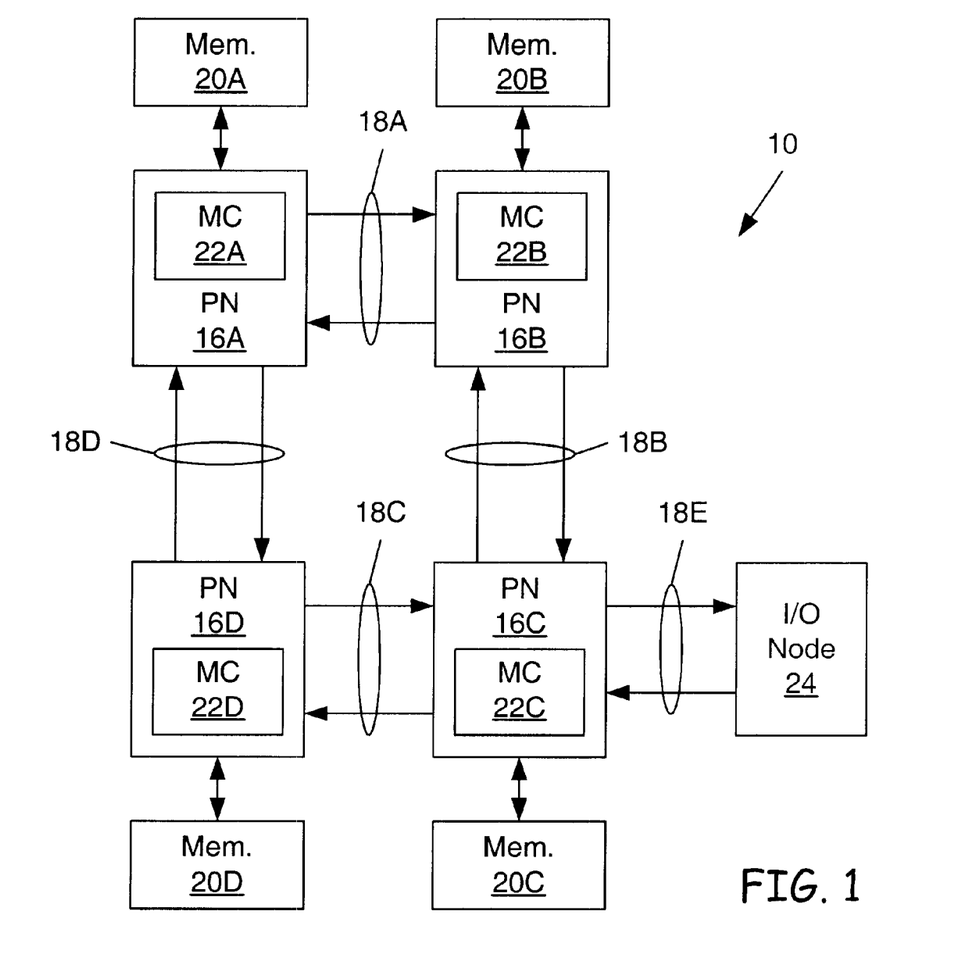
FIG. 1 is a block diagram of one embodiment of a computer system including several interconnected processing nodes and an input/output node coupled to one of the processing nodes.

FIG. 1 is a block diagram of one embodiment of a computer system 10 including several interconnected processing nodes (PN) 16A, 16B, 16C, and 16D. Other embodiments of computer system 10 are possible and contemplated. Processing node 16A is coupled to processing node 16B via a bidirectional communication link 18A. Similarly, processing node 16B is coupled to processing node 16C by a bidirectional communication link 18B, processing node 16C is coupled to processing node 16D by a bidirectional communication link 18C, and processing node 16D is coupled to processing node 16A by a bidirectional communication link 18D. As indicated in FIG. 1 and described in more detail below, each bidirectional communication link 18 within computer system 10 may include two unidirectional sets of transmission media (e.g., wires).

Each processing node 16A–16D is coupled to a respective memory 20A–20D via a memory controller (MC) 22A–22D included within each respective processing node 16A–16D. A memory address space of computer system 10 is assigned across memories 20A–20D such that computer system 10 has a distributed memory system.

Computer system 10 of FIG. 1 also includes an input/output (I/O) node 24 coupled to processing node 16C via a communication link 18E. I/O node 24 may embody one or more I/O functions (e.g., modem, sound card, etc.).

Figure 2:
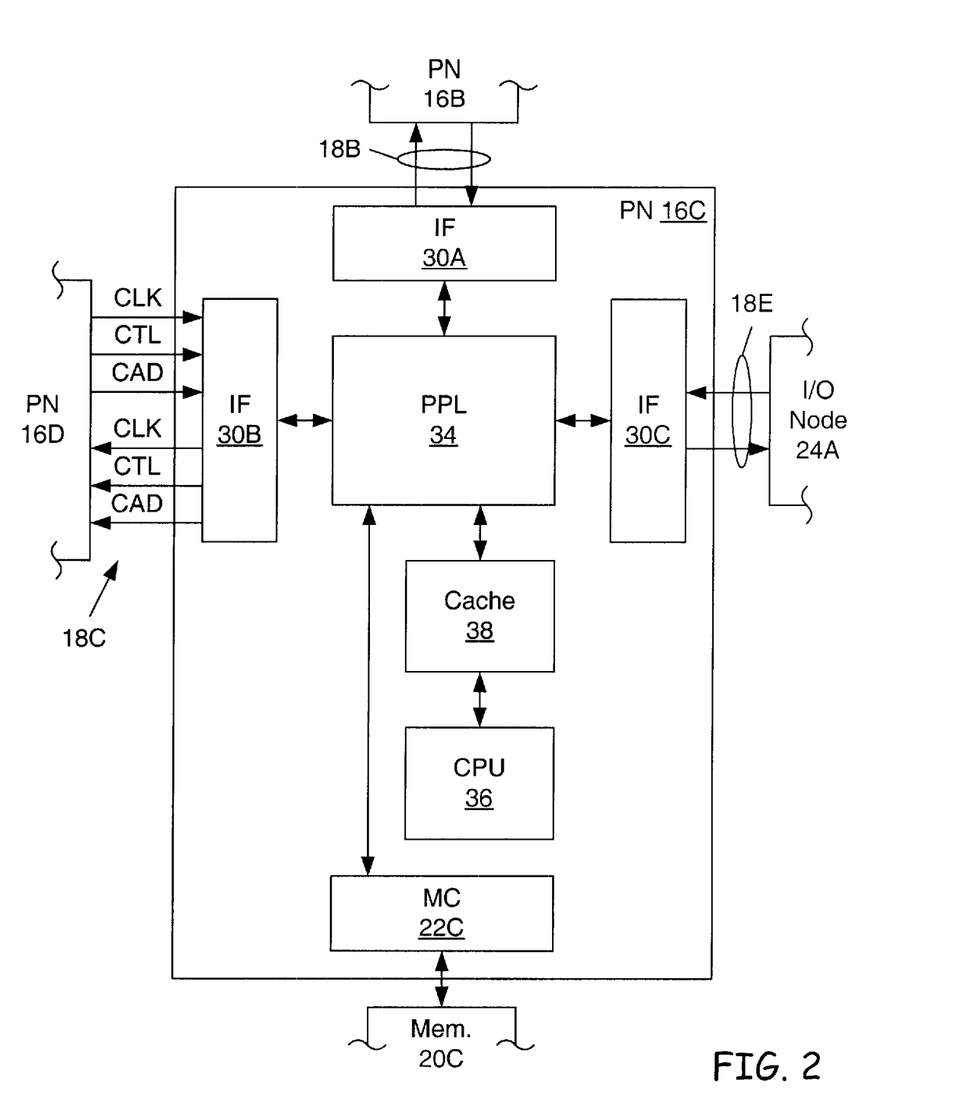
FIG. 2 is a block diagram of one embodiment of one of the processing nodes of FIG. 1, wherein the processing node includes a central processing unit (CPU) and a cache memory.

FIG. 2 is a block diagram of one embodiment of processing node 16C of FIG. 1. In addition to memory controller 22C, processing node 16C includes communication interfaces (IFs) 30A–30C, packet processing logic (PPL) 34, a cache memory 38, and a central processing unit (CPU) 36. Interfaces (IFs) 30A–30C are coupled to respective links 18B, 18C, and 18E. Processing node 16C communicates with processing nodes 16B and 16D via respective interfaces 30A and 30B, and with I/O node 24 via interface 30C. Packet processing logic 34 is coupled to interfaces 30A–30C and memory controller 22C. Cache 38 is coupled to packet processing logic 34, and CPU 36 is coupled to cache 38.

CPU 36 preferably includes circuitry for executing instructions according to a predefined instruction set. For example, the x86 instruction set architecture may be selected. Alternatively, the Alpha, PowerPC, or any other instruction set architecture may be selected. Generally, CPU 36 accesses cache 38 for instructions and data. If needed instructions and/or data is not present within cache 38 (i.e., a cache miss is detected), a read request is generated and transmitted to the memory controller within the processing node to which the missing cache block is mapped. In other embodiments of processing node 16C: (i) cache 38 may reside within CPU 36, or (ii) CPU 36 may include an internal cache in addition to, or instead of, cache 38.

Each processing node 16 in FIG. 1 may include a CPU similar to CPU 36, a cache similar to cache 38, packet processing logic similar to packet processing logic 34, and interfaces similar to interfaces 30. Memories 20A–20D in FIG. 1 may include any suitable memory devices. For example, each memory 20 may include one or more RAM-BUS DRAMs (RDRAMs), synchronous DRAMs (SDRAMs), static RAM, etc. As described above, the address space of computer system 10 is divided among memories 20A–20D. Each processing node 16A–16D may include a memory map used to determine which addresses are mapped to each of the memories 20A–20D, and hence to which processing node 16A–16D a memory request for a particular address should be routed.

Memory controllers 22A–22D coupled to respective memories 20A–20D include control circuitry for interfacing to memories 20A–20D. Memory controllers 22A–22D may include request queues for queuing memory access requests. Where multiple processing nodes 16 include caches similar to cache 38, memory controllers 22A–22D may be responsible for ensuring that memory accesses to respective memories 20A–20D occur in a cache coherent fashion.

As indicated in FIGS. 1 and 2 and described above, bidirectional communication links 18 may include two unidirectional sets of transmission media (e.g., wires). Communication link 18C in FIG. 2 includes a first set of three unidirectional transmission media directed from processing node 16D to interface 30B, and a second set of three unidirectional transmission media directed from interface 30B to processing node 16D. Both the first and second sets include separate transmission media for a clock (CLK) signal, a control (CTL) signal, and a command/address/data (CAD) signal. In a preferred embodiment, the CLK signals serves as a clock signal for the CTL and CAD signals. A separate CLK signal may be provided for each 8-bit byte of the CAD signal. The CAD signal is used to convey control packets and data packets. Types of control packets include command packets and response packets. The CAD signal may be, for example, 8, 16, or 32 bits wide, and may thus include 8, 16, or 32 separate transmission media.

The CTL signal is asserted when the CAD signal conveys a command packet, and is deasserted when the CAD signal conveys a data packet. The CTL and CAD signals may transmit different information on the rising and falling edges of the CLK signal. Accordingly, two data units may be transmitted in each period of the CLK signal. Communication link 18C in FIG. 2 and described above is preferably typical of communication links 18 within computer system 10.

Processing nodes 16A–16D implement a packet-based link for inter-processing node communication. Communication links 18 are used to transmit packets between processing nodes 16 within computer system 10, and are operated in a "coherent" fashion such that computer system 10 preserves the coherency of data stored within memories 20A–20D and the caches of processing nodes 16A–16D.

Interface logic used within computer system 10 (e.g., logic within interfaces 30A–30B) may include buffers for receiving packets from a communication link and for buffering packets to be transmitted upon the communication link. Computer system 10 may employ any suitable flow control mechanism for transmitting packets. For example, interface logic within each node may store a count of the number of each type of buffer within interface logic of a receiver node at the other end of a communication link. A sending node may not transmit a packet unless the receiving node has a free buffer of the correct type for storing the packet. As each buffer is freed within the receiving node (e.g., by forwarding a stored packet), the receiving node transmits a message to the sending node indicating that the buffer has been freed. Such a mechanism may be referred to as a "coupon-based" system.

A packet transmitted within computer system 10 may pass through one or more intermediate processing nodes. For example, a packet transmitted by processing node 16A to processing node 16C within computer system 10 may pass through either processing node 16B or processing node 16D. (See FIG. 1.) Any suitable packet routing algorithm may be used within computer system 10. Other embodiments of computer system 10 may include more or fewer processing nodes 16 than the embodiment of FIG. 1

Figure 3:
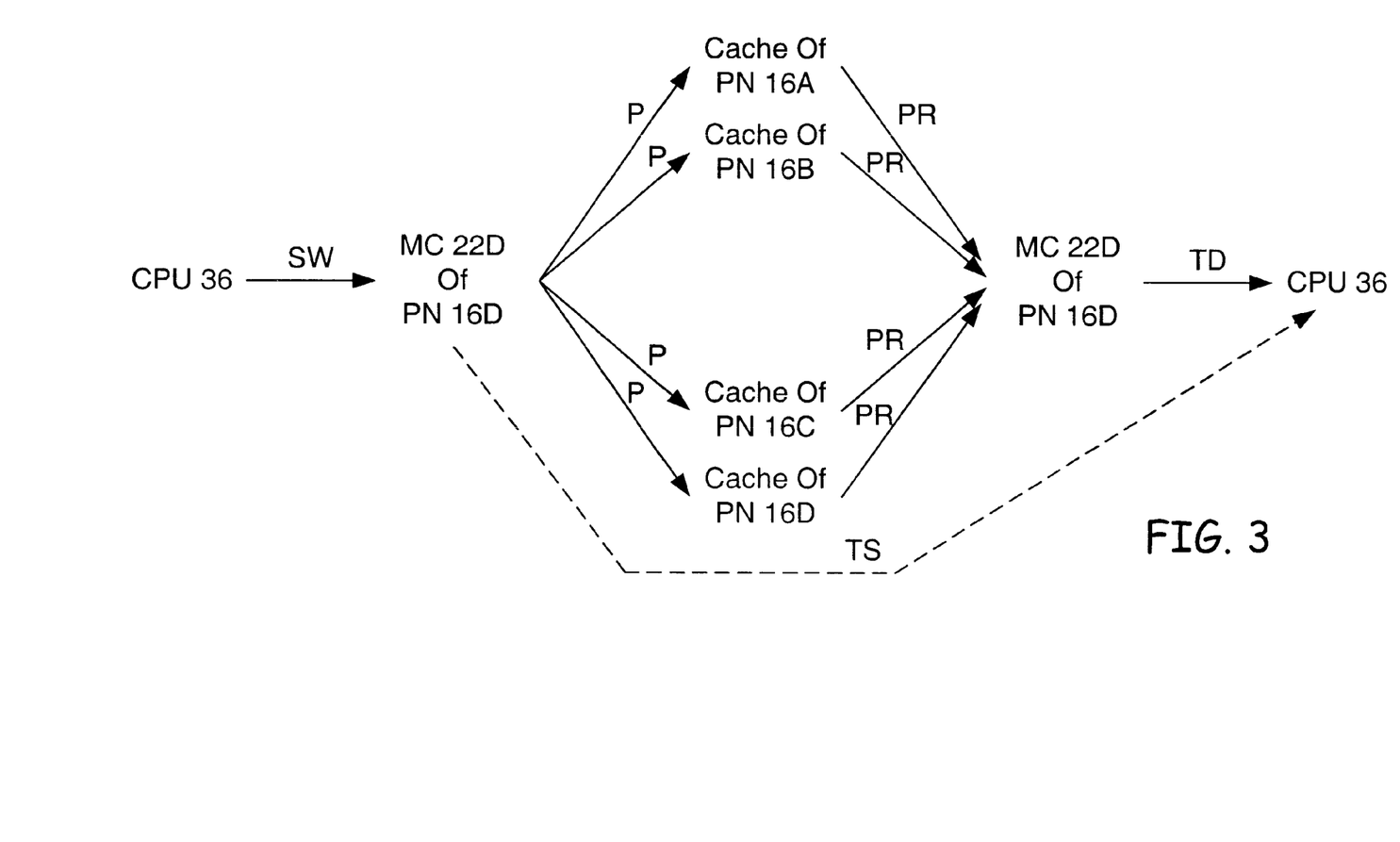
FIG. 3 is a diagram illustrating the events associated with an exemplary write transaction issued by the CPU of FIG. 2 as a function of time.

FIGS. 3–7 will now be used to describe events associated with an exemplary write command initiated by CPU 36 within processing node 16C and directed to a memory location within memory 20D coupled to processing node 16D. (See FIGS. 1 and 2.) In this example, it will be assumed that processing nodes 16A–16D include caches similar to cache 38 as described above. FIG. 3 is a diagram illustrating the events associated with the exemplary write command as a function of time. The write command may be, for example, a non-cacheable write command or a write command which writes through cache 38 to memory 20D.

CPU 36 initiates the write command in response to instruction execution, and provides the write command to cache 38. Cache 38 provides the write command to packet processing logic 34 within processing node 16C. Packet processing logic 34 uses the memory map described above to determine that the address accessed by the write command lies within memory 20D coupled to memory controller 22D of processing node 16D.

Figure 4:
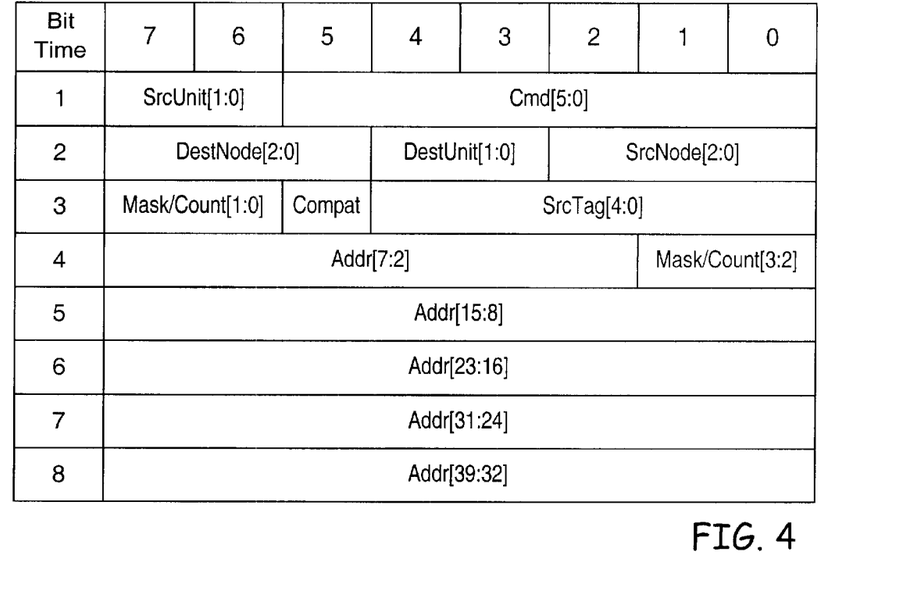
FIG. 4 is a diagram of an exemplary sized write command packet format.

In response to the write command, packet processing logic 34 initiates a write transaction. The write transaction includes a write command packet followed by a data packet including the data to be stored within memory 20D. Packet processing logic 34 produces a write command packet as a sized write (SW) command packet. FIG. 4 is a diagram of an exemplary sized write command packet format. The packet format of FIG. 4 shows the contents of bits 7–0 of bytes transmitted in parallel during 8 consecutive "bit times". The amount of time used to transmit each data unit of a packet (e.g., byte) is referred to herein as a "bit time". Each bit time is a portion of a period of the CLK signal. For example, within a single period of the CLK signal, a first byte may be transmitted on a rising edge of the CLK signal, and a different byte may be transmitted on the falling edge of the CLK signal. In this case, the bit time is half the period of the CLK signal.

The sized write command packet of FIG. 4 includes a command field Cmd[5:0], a destination node field DestNode[2:0], a destination unit field DestUnit[1:0], a source node field SrcNode[2:0], a source unit field SrcUnit[1:0], a source tag field SrcTag[4:0], and an address field Addr[39:2]. The contents of the command field Cmd[5:0] identifies the type of packet. The destination node field DestNode[2:0] identifies the target node to which the packet should be routed, and the destination unit field DestUnit[1:0] identifies the unit within the destination node to receive the packet (e.g., a memory controller within the destination node). The source node field SrcNode[2:0] identifies the source node for the transaction, and the source unit field SrcUnit[1:0] identifies the originating unit within the source node (e.g., a CPU within the source node). The source tag field SrcTag[4:0] is a transaction tag uniquely identifying the transaction. Each processing node within computer system 10 may have, for example, a maximum of $2^5$ or 32 transactions in progress at any given time. Addr[39:2] identifies the address accessed by the command.

The sized write command packet of FIG. 4 also includes a mask/count field Mask/Count[3:0] and a compatibility bit Compat. The mask/count field Mask/Count[3:0] either indicates which bytes within a data unit (e.g., 32-bit doubleword) are to be read (mask), or encodes the number of data units to be transferred (count). The compatibility bit Compat is a routing bit used with legacy hardware.

Packet processing logic 34 generates the sized write command packet with the contents of Cmd[5:0] identifying the packet as a sized write command packet, DestNode[2:0] identifying processing node 16D as the target (e.g., a NodeID of processing node 16D), DestUnit[1:0] identifying memory controller 22D as the destination unit, SrcNode[2:0] identifying processing node 16C as the source node (e.g., a NodeID of processing node 16C), SrcUnit[1:0] identifying CPU 36 as the source unit, and SrcTag[4:0] being a source tag of processing node 16C.

Packet processing logic 34 provides the packets of the write transaction (i.e., the sized write command packet and the data packet) to interface 30B of processing node 16C. Interface 30B transmits the packets of the write transaction to processing node 16D via communication link 18C. The packet processing logic of processing node 16D uses the contents of destination unit field DestUnit [1:0] to determine that memory controller 22D is to receive the write operation, and provides the information contained within the packets of the write transaction to memory controller 22D.

In response to the sized write command, memory controller 22D properly orders the write operation with respect to other pending operations within memory controller. Memory controller 22D may optionally signal CPU 36 that the write command is properly ordered (i.e., serialized) with respect to other pending operations within the target via a target start (TS) packet. Memory controller 22D also broadcasts probe command packets (P) to all processing nodes 16A–16D of computer system 10.

Upon receiving a probe command packet, the packet processing logic within each processing node directs the probe command information to the cache within the processing node. If a cache receiving a probe command includes data associated with the address information of the probe command, but the data has not been modified, the cache invalidates the data and returns a probe response (PR) packet. On the other hand, if the cache includes modified data associated with the address information of the probe command, the cache returns the modified data via a read response transaction. The read response transaction includes a read response packet followed by a data packet including the modified data.

Figure 5:
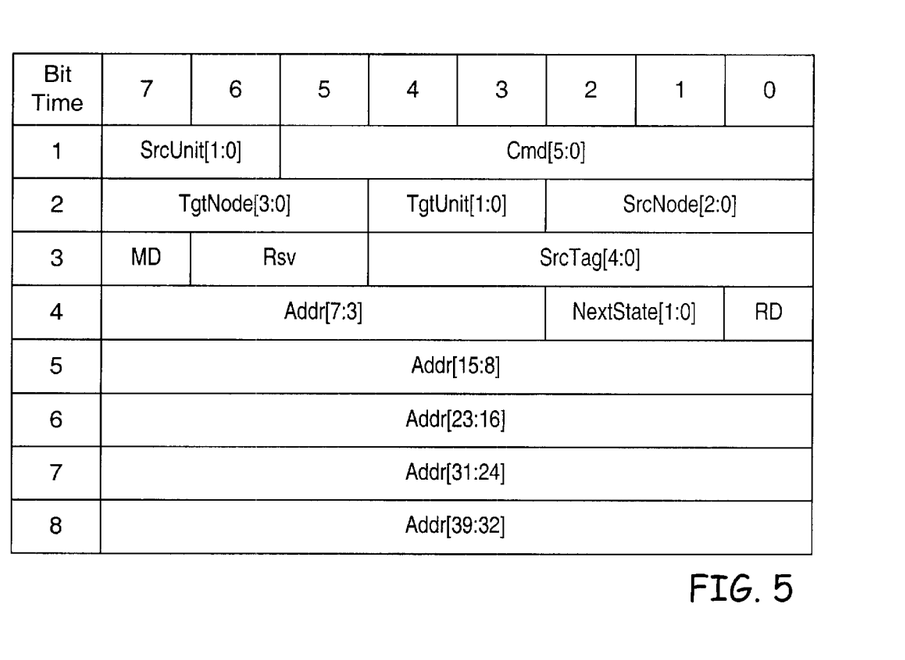
FIG. 5 is a diagram of one embodiment of a probe command packet.

FIG. 5 is a diagram of one embodiment of a probe command packet. The probe command packet of FIG. 5 includes a command field Cmd[5:0], a target node field TgtNode[3:0], a target unit field TgtUnit[1:0], a source node field SrcNode[2:0], a source unit field SrcUnit[1:0], a source tag field SrcTag[4:0], and an address field Addr[39:3]. The command field Cmd[5:0], the source node field SrcNode[2:0], the source unit field SrcUnit[1:0], the source tag field SrcTag[4:0], and the address field Addr[39:3] are similar to those described above with respect to the sized write command packet of FIG. 4. The target node field TgtNode[3:0] contains a value identifying the target node for probe responses, and the target unit field TgtUnit[1:0] contains a value identifying the target unit for probe responses.

In this example, the command field Cmd[5:0] contains a value which identifies the packet as a probe command. The target node field TgtNode[3:0] contains a value identifying processing node 16D (e.g., the NodeID of processing node 16D) as the target node for probe responses. The target unit field TgtUnit[1:0] contains a value identifying memory controller 22D as the target unit for probe responses. The source node field SrcNode[2:0] contains a value identifying node 16D (e.g., the NodeID of processing node 16D) as the source node issuing the probe command, and the source unit field SrcUnit[1:0] contains a value identifying memory controller 22D as the source unit issuing the probe command. The contents of SrcTag[4:0] is a source tag of processing node 16D assigned by processing node 16D to the probe command. Addr[39:3] identifies the address accessed by the write command.

The probe command packet of FIG. 5 also includes a memory data bit MD, a field reserved for future use Rsv, a next state field NextState[1:0], and a return data bit RD. The memory data bit MD indicates whether a read data response is required. The next state field NextState[1:0] indicates a cache state transition which should occur if the addressed data exists within the cache. The read data bit RD indicates whether data movement is required.

Figure 6:
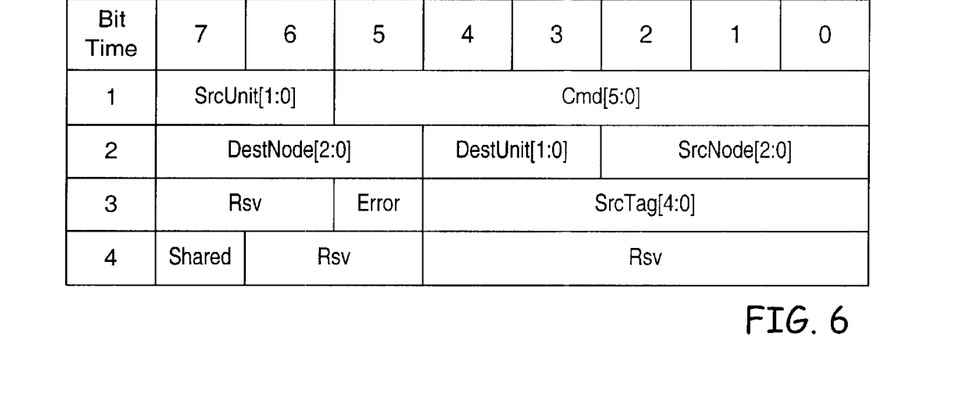
FIG. 6 is a diagram of one embodiment of a probe response packet.

FIG. 6 is a diagram of one embodiment of a probe response packet. The probe response packet of FIG. 6 includes a command field Cmd[5:0], a destination node field DestNode[2:0], a destination unit field DestUnit[1:0], a source node field SrcNode[2:0], a source unit field SrcUnit[1:0], and a source tag field SrcTag[4:0]. The command field Cmd[5:0], the destination node field DestNode[2:0], the destination unit field DestUnit[1:0], the source node field SrcNode[2:0], the source unit field SrcUnit[1:0], and the source tag field SrcTag[4:0] are similar to those described above with respect to the sized write command packet of FIG. 4.

In this example, the command field Cmd[5:0] contains a value which identifies the packet as a probe response. The destination node field DestNode[2:0] contains a value identifying processing node 16D (e.g., the NodeID of processing node 16D) as the destination of the probe response packet. The destination unit field DestUnit[1:0] contains a value identifying memory controller 22D as the destination unit of the probe response. The source node field SrcNode[2:0]

identifies the source node issuing the probe response. The source unit field SrcUnit[1:0] identifies the unit issuing the probe response. The contents of SrcTag[4:0] is a source tag of the processing node issuing the probe response.

The probe response packet of FIG. 6 also includes several fields reserved for future use Rsv, an error bit Error, and a shared bit Shared. The error bit Error indicates whether the probe request resulted in an error. The shared bit Shared indicates whether the probed node is maintaining a copy of the addressed data.

Memory controller 22D receives a probe response (PR) from each processing node 16A–16D. If one or more of the probe responses are read responses, memory controller 22D merges the write data with the data of the read responses. At this point, memory controller 22D has: (i) properly ordered the write operation with respect to other pending operations within memory controller 22D, and (ii) determined that a correct "coherency state" with respect to the write command has been established within the processing nodes 16A–16D. When the write command/operation is properly ordered within memory controller 22D and the correct coherency state with respect to the write command/operation has been established within the processing nodes 16A–16D, the write command/operation has reached a "point of coherency" within computer system 10. Memory controller 22D then transmits a target done (TD) response packet to CPU 36 via communication link 18C and interface 30B.

Memory controller 22D receives memory access commands from each of the processing nodes 16A–16D, and orders the memory access commands chronologically based upon the time at which the commands are received. The write command/operation is thus properly ordered when memory controller 22D orders the write command/operation chronologically with respect to other pending operations within memory controller 22D.

The coherency state with respect to the write command has been established when each copy of the data within the processing nodes 16A–16D and accessed by the write command/operation reflects: (i) the effects of the write command/operation, and (ii) the effects of each command/operation occurring prior to the write command/operation. For example, in one embodiment, the effects of the write command/operation may include the invalidation of other copies of the data within the processing nodes 16A–16D.

Figure 7:
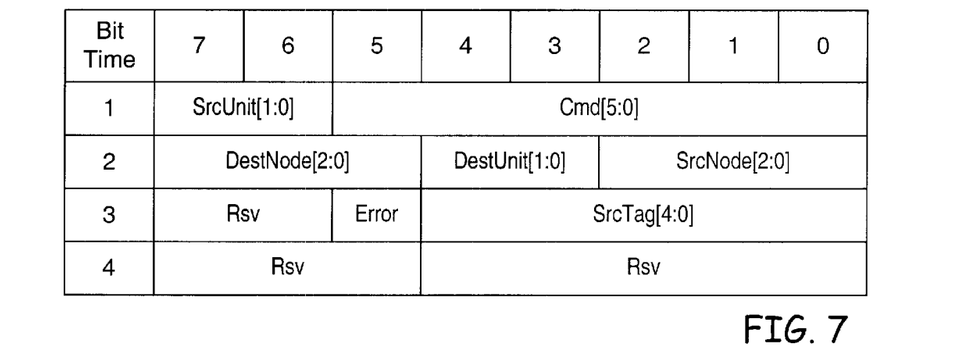
FIG. 7 is a diagram of one embodiment of a target done response packet.

FIG. 7 is a diagram of one embodiment of a target done response packet. The target done response packet of FIG. 7 includes a command field Cmd[5:0], a destination node field DestNode[2:0], a destination unit field DestUnit[1:0], a source node field SrcNode[2:0], a source unit field SrcUnit[1:0], and a source tag field SrcTag[4:0]. The command field Cmd[5:0] contains a value which identifies the packet as a target done response. The command field Cmd[5:0], the destination node field DestNode[2:0], the destination unit field DestUnit[1:0], the source node field SrcNode[2:0], the source unit field SrcUnit[1:0], and the source tag field SrcTag[4:0] are similar to those described above with respect to the sized write command packet of FIG. 4.

In this example, the destination node field DestNode[2:0] contains a value identifying processing node 16C (e.g., the NodeID of processing node 16C) as the destination of the target done response packet. The destination unit field DestUnit[1:0] contains a value identifying CPU 36 as the destination unit of the target done response. The source node field SrcNode[2:0] identifies processing node 16D (e.g., the NodeID of processing node 16D) as the source node issuing the target done response. The source unit field SrcUnit[1:0] identifies memory controller 22D as the source unit issuing the target done response. The contents of SrcTag[4:0] is the source tag originally assigned to the write operation by CPU 36 (i.e., the source tag of the original sized write command packet generated by CPU 36). The target done response packet of FIG. 7 also includes several fields reserved for future use Rsv and an error bit Error which indicates whether the probe request resulted in an error.

It is noted that when memory controller 22D transmits the target done response packet to CPU 36, the write command has at least reached the point of coherency within computer system 10, and the write operation may or may not have been actually completed. In other words, when memory controller 22D transmits the target done response packet, the write operation has been properly ordered with respect to other pending operations, and a correct coherency state with respect to the write operation has been established in the other processing nodes. However, memory controller 22D may or may not have actually stored the data associated with the write command within memory 20D.

Figure 8:
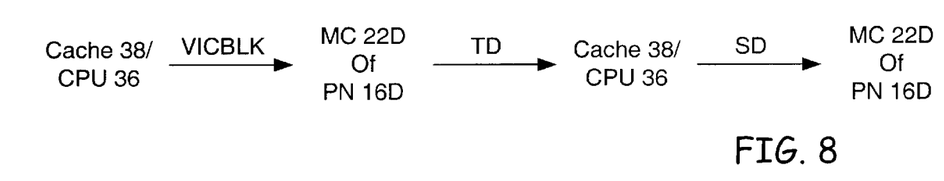
FIG. 8 is a diagram illustrating the events associated with an exemplary victim block write command issued by the cache and/or the CPU of FIG. 2 as a function of time.
Figure 9:
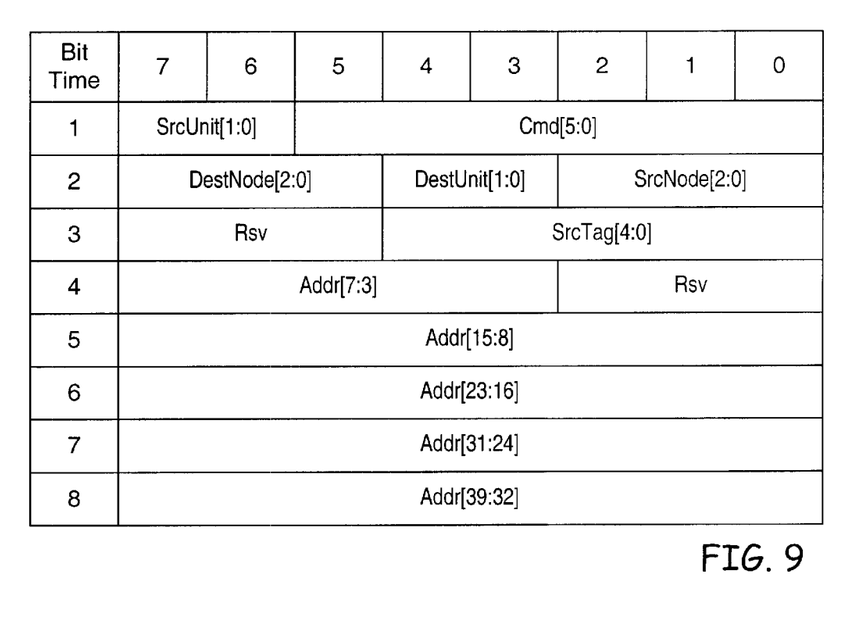
FIG. 9 is a diagram of one embodiment of a victim block command packet.

FIGS. 8–9 will now be used to describe events associated with an exemplary victim block write command initiated by cache 38/CPU 36 within processing node 16C and directed to a memory location within memory 20D coupled to processing node 16D. (See FIGS. 1 and 2.) Cache38/CPU 36 initiates the victim block write command to evict modified (i.e., "dirty") data from cache 38 and to store the cache block data within memory. When cache 38 is physically separated from CPU 36 as shown in FIG. 2, the victim block write command may be initiated by cache 38. Cache 38 may be located within CPU 36 as described above, and in this case the victim block write command may be initiated by cache 38 or CPU 36.

Cache 38/CPU 36 provides the victim block write command to packet processing logic 34 within processing node 16C. Packet processing logic 34 uses the memory map described above to determine that the addresses accessed by the victim block write command lie within memory 20D coupled to memory controller 22D of processing node 16D. In response to the victim block write command, packet processing logic 34 initiates a victim block write transaction. The victim block write transaction includes a victim block (VICBLK) command packet followed by a data packet including the cache block data to be stored within memory 20D.

FIG. 9 is a diagram of an exemplary victim block command packet format. The victim block command packet of FIG. 9 includes a command field Cmd[5:0], a destination node field DestNode[2:0], a destination unit field DestUnit[1:0], a source node field SrcNode[2:0], a source unit field SrcUnit[1:0], a source tag field SrcTag[4:0], and an address field Addr[39:3]. The command field Cmd[5:0], the destination node field DestNode[2:0], the destination unit field DestUnit[1:0], the source node field SrcNode[2:0], the source unit field SrcUnit[1:0], and the source tag field SrcTag[4:0], and the address field Addr[39:3] are similar to those described above with respect to the sized write command packet of FIG. 4.

In this example, the contents of the command field Cmd[5:0] identifies the command as a victim block write command. The destination node field DestNode[2:0] identifies the destination node of the packet, and the destination unit field DestUnit[1:0] identifies the destination unit of the packet. The source node field SrcNode[2:0] identifies the source node of the packet, and the source unit field SrcUnit[1:0] identifies the source unit of the packet. The source tag field SrcTag[4:0] is a transaction tag which uniquely identifies the transaction. Addr[39:3] identifies the addresses accessed by the victim block write command. The victim block command packet of FIG. 9 also includes several fields reserved for future use Rsv.

Packet processing logic 34 generates the victim block command packet with the contents of DestNode[2:0] identifying processing node 16D as the target (e.g., a NodeID of processing node 16D), DestUnit[1:0] identifying memory controller 22D as the destination unit of the packet, SrcNode [3:0] identifying processing node 16C as the source of the write transaction (e.g., a NodeID of processing node 16C), SrcUnit[1:0] identifying cache38/CPU 36 as the source unit of the packet, and SrcTag[4:0] being a source tag of processing node 16C.

Packet processing logic 34 provides the packets of the victim block write transaction (i.e., the victim block command packet and the data packet) to interface 30B of processing node 16C. Interface 30B transmits the packets of the victim block write transaction to processing node 16D via communication link 18C. The packet processing logic of processing node 16D uses the contents of destination unit field DestUnit[1:0] to determine that memory controller 22D is to receive the write operation, and provides the information contained within the packets of the write transaction to memory controller 22D.

The packet processing logic of processing node 16D provides the victim block write command to memory controller 22D. In response to the victim block write command, memory controller 22D properly orders the victim block write operation with respect to other pending operations within memory controller 22D. Computer system 10 preferably implements a cache protocol which continuously maintains coherency with respect to data stored within the caches of processing nodes 16A–16D such that a correct coherency state with respect to the victim block write command has been established within the processing nodes 16A–16D. At this point, the victim block write operation has reached a point of coherency within computer system 10, and memory controller 22D issues a target done (TD) response packet to cache 38/CPU 36 as described above. Cache 38/CPU 36 may respond to the target done response by transmitting a source done (SD) response packet to memory controller 22D. The format of the source done response packet may be similar to the target done response packet format of FIG. 7, wherein command field Cmd[5:0] contains a value which identifies the packet as a source done response.

It is again noted that when memory controller 22D transmits the target done response packet to CPU 36, the victim block write command has at least reached the point of coherency within computer system 10, and the victim block write operation may or may not have been actually completed as described above.

Cache 38/CPU 36 may store the victim block in, for example, a buffer. During the time period between transmission of the victim block command and reception of the target done response, cache 38/CPU 36 may continue to maintain coherency for the victim block. The target done response from memory controller 22D may signal cache 38/CPU 36 that cache 38/CPU 36 may stop maintaining coherency for the victim block.

FIGS. 4–7 and 9 illustrate packets formed by transmitting bytes in parallel during consecutive bit times (i.e., consecutive portions of clock signal CLK). It is noted that the packet information may be transmitted in fewer bit times by concatenating the bits of consecutive bit times and transmitting them in parallel as a single data unit. For example, the information of the sized write command packet of FIG. 4 may be transmitted in 4 bit times by concatenating the bytes of each set of 2 consecutive bit times to form 16-bit quantities, and transmitting the 16-bit quantities in parallel during each of the 4 bit times. Similarly, the information of the sized write command packet of FIG. 4 may be transmitted in 2 bit times by concatenating the bytes of each set of 4 consecutive bit times to form 32-bit quantities, and transmitting the 32-bit quantities in parallel during each of the 2 bit times.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a plurality of interconnected processing nodes, wherein at least one of the processing nodes includes a central processing unit (CPU), and wherein at least one of the processing nodes includes a memory controller coupled to a memory;
   wherein the CPU is configured to generate a write command to store data within the memory; and
   wherein the memory controller is coupled to receive the write command, and wherein the memory controller is configured, in response to the write command, to:
   transmit a probe request to each of the plurality of processing nodes that includes a cache;
   receive a probe response to the probe request from each of the plurality of processing nodes that includes a cache; and
   issue a target done response to the CPU in response to receiving the probe response from each of the plurality of processing nodes that includes a cache.

2. The computer system as recited in claim 1, wherein the CPU is configured to execute instructions of a predefined instruction set.

3. The computer system as recited in claim 2, wherein the CPU is configured to generate the write command in response to instruction execution.

4. The computer system as recited in claim 1, wherein each of the processing nodes comprises a CPU.

5. The computer system as recited in claim 1, wherein at least two of the processing nodes include a memory controller coupled to a different memory, and wherein a different portion of a memory address space of the computer system is associated with each memory controller and memory coupled thereto.

6. The computer system as recited in claim 1, wherein the processing node including the CPU and the processing node including the memory controller are different processing nodes, and wherein the processing nodes of the computer system are configured to route the write command from the processing node including the CPU to the processing node including the memory controller.

7. A method in a computer system, comprising:
   a central processing unit (CPU) issuing a write command to store data within a memory;
   a memory controller coupled to the memory receiving the write command;
   the memory controller, in response to receiving the write command, sending a probe request to each processing node including a cache;
   the memory controller receiving a probe response from each processing node including a cache; and
   the memory controller issuing a target done response to the CPU in response to receiving the probe response from each processing node including a cache.

8. A node comprising a memory controller, wherein the node is coupled to receive a write command to store data within a memory controlled by the memory controller, and wherein the memory controller is configured to respond to the write command by issuing a target done response to an initiator of the write command, the memory controller issuing the target done response further in response to receiving a probe response for each of one or more probes issued by the memory controller in response to the write command.

* * * * *